United States Patent [19]

Wheeler

[11] Patent Number: 5,795,132

[45] Date of Patent: Aug. 18, 1998

[54] VARIABLE PITCH PROPELLER

[75] Inventor: James Lance Wheeler, Arlington, Wash.

[73] Assignee: Something Else Limited Liability Co., Duvall, Wash.

[21] Appl. No.: 418,528

[22] Filed: Apr. 7, 1995

[51] Int. Cl.$^6$ .................................................. B64C 11/34
[52] U.S. Cl. ...................................... 416/147; 416/155
[58] Field of Search ........................... 416/147, 35, 38, 416/46, 48, 155, 61

[56] References Cited

U.S. PATENT DOCUMENTS

| | | | |
|---|---|---|---|
| 12,665 | 4/1855 | Boardman . | |
| 15,638 | 9/1856 | Adkins . | |
| Re. 18,957 | 9/1933 | Gobereau et al. | 416/53 |
| 642,601 | 2/1900 | Gere | 416/167 |
| 769,256 | 9/1904 | Enge | 416/167 |
| 861,612 | 7/1907 | Shultz | 416/167 |
| 1,374,786 | 4/1921 | Walker | 416/155 |
| 1,404,269 | 1/1922 | Caldwell | 170/160.47 |
| 1,425,922 | 8/1922 | Wesnigk | 416/124 |
| 1,620,968 | 3/1927 | Heath | 416/205 |
| 1,722,182 | 7/1929 | Taylor | 416/167 |
| 1,747,230 | 2/1930 | Duprey | 416/155 |
| 1,773,550 | 8/1930 | Scott | 416/167 |
| 1,810,159 | 6/1931 | Carol | 416/155 |
| 1,837,318 | 12/1931 | Eustis | 416/205 |
| 1,877,821 | 9/1932 | Covey | 416/165 |
| 1,916,465 | 6/1933 | Kohlstedt | 416/155 |
| 2,054,810 | 9/1936 | Gaba | 416/165 X |
| 2,118,652 | 5/1938 | Meijer | 416/155 |
| 2,118,653 | 5/1938 | Meijer | 416/155 |
| 2,127,264 | 8/1938 | Lampton | 416/248 |
| 2,223,081 | 11/1940 | Thomas | 170/162 |
| 2,297,142 | 9/1942 | German | 416/239 X |
| 2,370,135 | 2/1945 | Berliner | 416/162 |
| 2,443,239 | 6/1948 | Greenwood | 416/205 |
| 2,474,635 | 6/1949 | Nichols | 416/162 |
| 2,595,231 | 5/1952 | Dermond | 170/135.7 |
| 2,792,897 | 5/1957 | Dagrell | 416/165 |
| 2,850,106 | 9/1958 | Swan | 416/167 |
| 2,925,131 | 2/1960 | Willi | 170/160.32 |
| 3,130,677 | 4/1964 | Liebhart | 417/336 |
| 3,163,231 | 12/1964 | Barnes et al. | 170/135.24 |
| 3,242,992 | 3/1966 | Quenneville et al. | 416/158 |
| 3,380,535 | 4/1968 | Biermann | 170/160.2 |
| 3,567,340 | 3/1971 | Schneider et al. | 416/162 |
| 4,037,986 | 7/1977 | Chilman | 416/46 |
| 4,523,891 | 6/1985 | Schwartz et al. | 416/157 R |
| 4,643,643 | 2/1987 | Otto | 416/154 |
| 4,778,344 | 10/1988 | Water | 416/239 |
| 5,090,869 | 2/1992 | Wright | 416/147 |
| 5,209,640 | 5/1993 | Moriya | 416/27 |
| 5,281,095 | 1/1994 | Komura et al. | 416/147 |

FOREIGN PATENT DOCUMENTS

| | | | |
|---|---|---|---|
| 544926 | 8/1957 | Canada | 416/167 |
| 1095464 | 6/1955 | France | 416/167 |
| 1 003 912 | 3/1957 | Germany | 416/167 |
| 32 05 216 | 9/1982 | Germany | B63H 3/08 |
| 3309840A1 | 9/1984 | Germany | B64C 11/40 |
| 34 06 634 | 8/1985 | Germany | 416/165 |
| 55-134800 | 10/1980 | Japan | 416/167 |
| 59-149890 | 8/1984 | Japan | 416/158 |
| 61-77593 | 4/1986 | Japan | 416/158 |
| 61-77594 | 4/1986 | Japan | 416/158 |
| 703458 | 2/1954 | United Kingdom | 416/165 |
| 822469 | 10/1959 | United Kingdom | 416/165 |
| 860205 | 2/1961 | United Kingdom | 416/165 |
| 2 051 966 | 1/1981 | United Kingdom | 416/167 |
| 2 051 967 | 1/1981 | United Kingdom | 416/167 |

*Primary Examiner*—John T. Kwon
*Attorney, Agent, or Firm*—Sheridan Ross P.C.

[57] ABSTRACT

A variable pitch mechanism for a propeller is provided which has a simplified design in which, during normal operation, all component parts rotate substantially as a unit. In one embodiment the range of available pitches is limited automatically when a propeller is rotating above a threshold rate. In one embodiment, an actuator, preferably non-integral with a driver, can be moved, using the driver, so as to rotate a propeller blade about its longitudinal axis. Preferably the blade actuator and driver rotate substantially as a unit about the rotation axis of the propeller assembly.

6 Claims, 6 Drawing Sheets

VARIABLE PITCH PROPELLER

BACKGROUND INFORMATION

A number of factors can affect the efficiency of a propeller such as an aircraft propeller, with an important factor being the propeller pitch. For a given propeller blade, a change in pitch can be characterized as an angle of rotation about the longitudinal blade axis. Fixed-pitch propellers for aircraft have been used on a number of types of aircraft. In many situations, fixed-pitch propellers are most suitable for aircraft which have a small range of crankshaft rotation rates such as a range between about 2100 and about 2700 rpm. However, the shortcomings of fixed-pitch propellers become more important when used in connection with aircraft that have a large range of rotation rate such as a range between about 3400 and 5800 rpm. This range provides a greater range of torque and horsepower with greatest torque being provided at lower rpm's and greatest horsepower being provided at higher rpm's. The most desirable pitch for an aircraft propeller depends on a number of conditions such as the throttle setting, the manifold pressure, and the rate of rotation. Thus for aircraft with a larger range of rate of rotation, a propeller pitch which is fixed at a value suitable for the middle of the rotation rate range may result in extreme inefficiency near the limits of the rotation rate range if the range is particularly wide.

A number of configurations have been proposed for providing a variable-pitch mechanism. In the configuration described in U.S. Pat. No. 5,281,095 issued Jan. 25, 1994 to Takashi Komura, et al. an eccentric pin projecting from the end of a propeller blade attachment shaft is held in an annular groove of an adjusting ring. The adjusting ring is axially movable. Axial displacement of the adjusting ring causes movement of the eccentric pins and forces the propeller blades to rotate through their own axis for adjusting the pitch of the propeller blades.

In some devices, some portions of the mechanism rotate with the blades while other portions do not. For example, in the device described in U.S. Pat. No. 5,281,095, an adjusting ring is rotated in unison with the propeller, but a movable cylinder which moves axially with the adjusting ring is not rotated with the propeller. A bearing 13 is provided for the adjusting ring to be coupled to the movable cylinder.

It is believed that, for at least some applications, providing a mechanism in which some portions of the pitch adjustment mechanism rotate with the blades while others do not adds undesirably to the complexity and cost of designing, producing and maintaining the apparatus. Accordingly, it would be desirable to provide a pitch adjustment mechanism which reduces the need for rotational bearings.

In some devices a slide, coupled to blade root pins is configured to engage directly with a screw member for moving the slide. Forming a single piece slide that includes both the pin engagement and the screw engagement is believed to add undesirably to the cost of the device and to place undesirable constraints on choice of materials.

Particularly when a propeller is used in an aircraft, it is desirable to provide safety features, e.g. to prevent a change in pitch to a flat or "beta" pitch or other pitch which results in loss of thrust, whether caused by accident or by mechanical or control failure. On the other hand, there are situations when it is desirable to change pitch to a flat or "beta" position (providing little thrust or even reverse thrust) such as when the aircraft is on the ground. Accordingly it would be desirable to provide a device which prevents undesirable pitch change during flight conditions but permits full range of pitch change during other conditions.

SUMMARY OF THE INVENTION

According to one aspect of the invention a drive shaft is connected to a propeller hub device, e.g. by an adapter plate and all components of the mechanism from the plate forward, including all variable pitch adjustment mechanisms, rotate as a unit.

According to one aspect of the invention an actuator device is formed of a resilient material such that components can be engaged in the actuator in a secure low "backlash" fashion without requiring the high degree of fabrication tolerance needed by less resilient material. Preferably the actuator is coupled to a lead nut which is non-integral with the actuator, for engaging a lead screw.

In one embodiment of the invention, blade pitch range is limited by a lock out device actuated by centrifugal force so that lock out is automatically disengaged at low rpm.

In one aspect of the invention, blade pitch is controlled automatically in response to sensed conditions such as throttle position, manifold pressure and rpm, with a sensor providing current pitch value information.

DETAILED DESCRIPTION OF THE PREFERRED EMBODIMENT

Figure 1A:
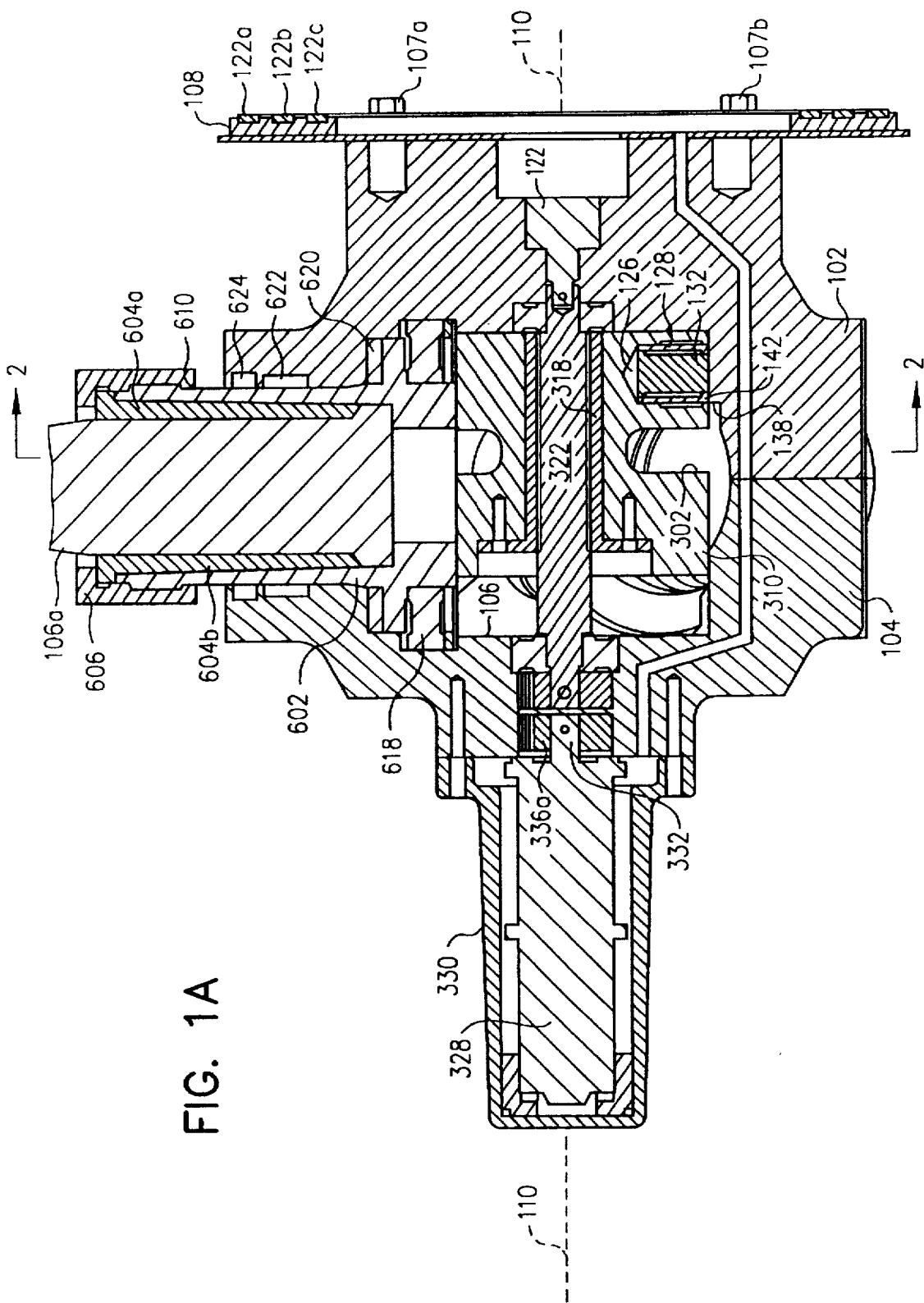
FIG. 1A is a longitudinal cross sectional view of apparatus according to and embodiment of the present invention.
Figure 2:
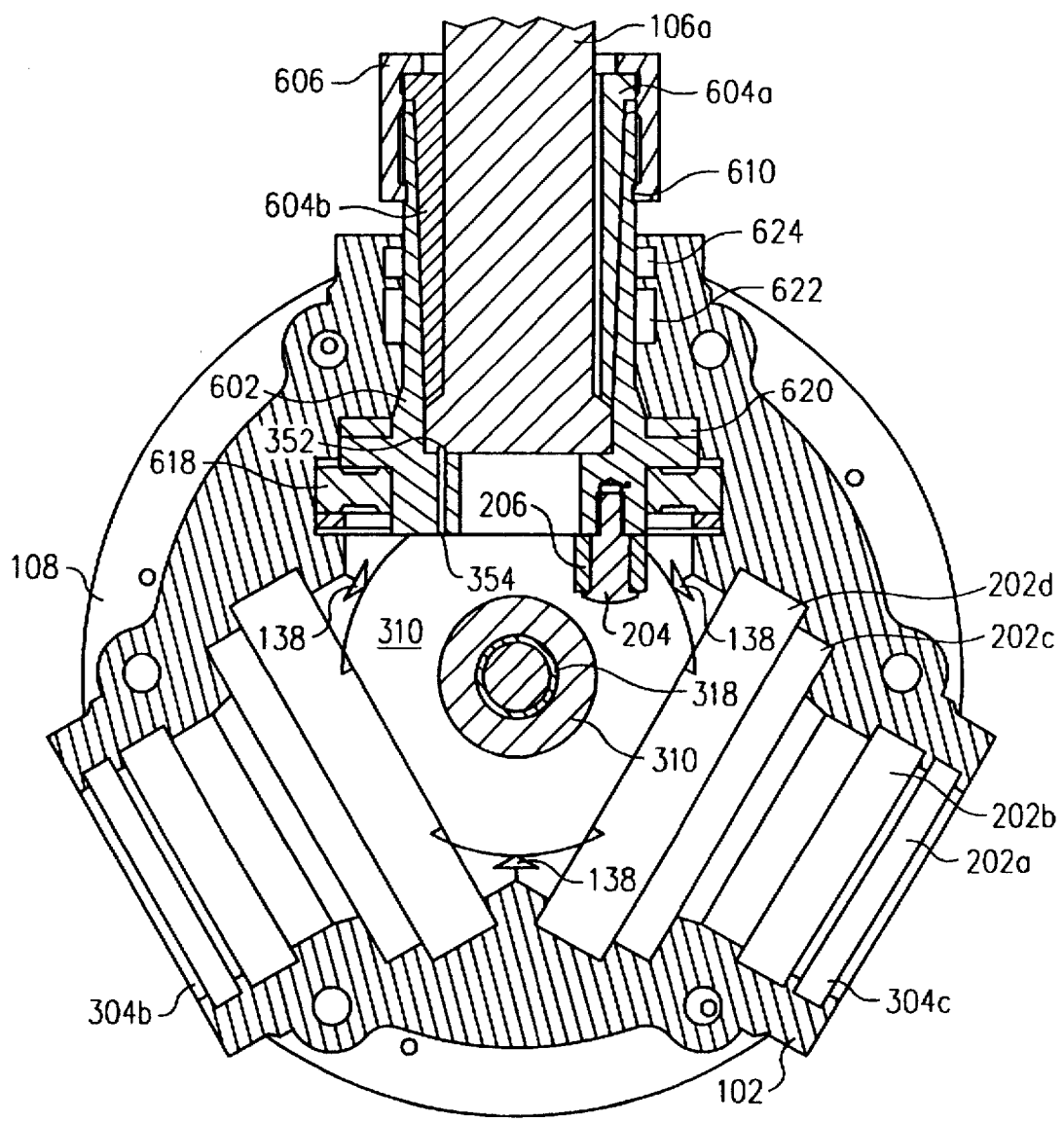
FIG. 2 is a lateral cross sectional view taken along line 2—2 of FIG. 1A.
Figure 3:
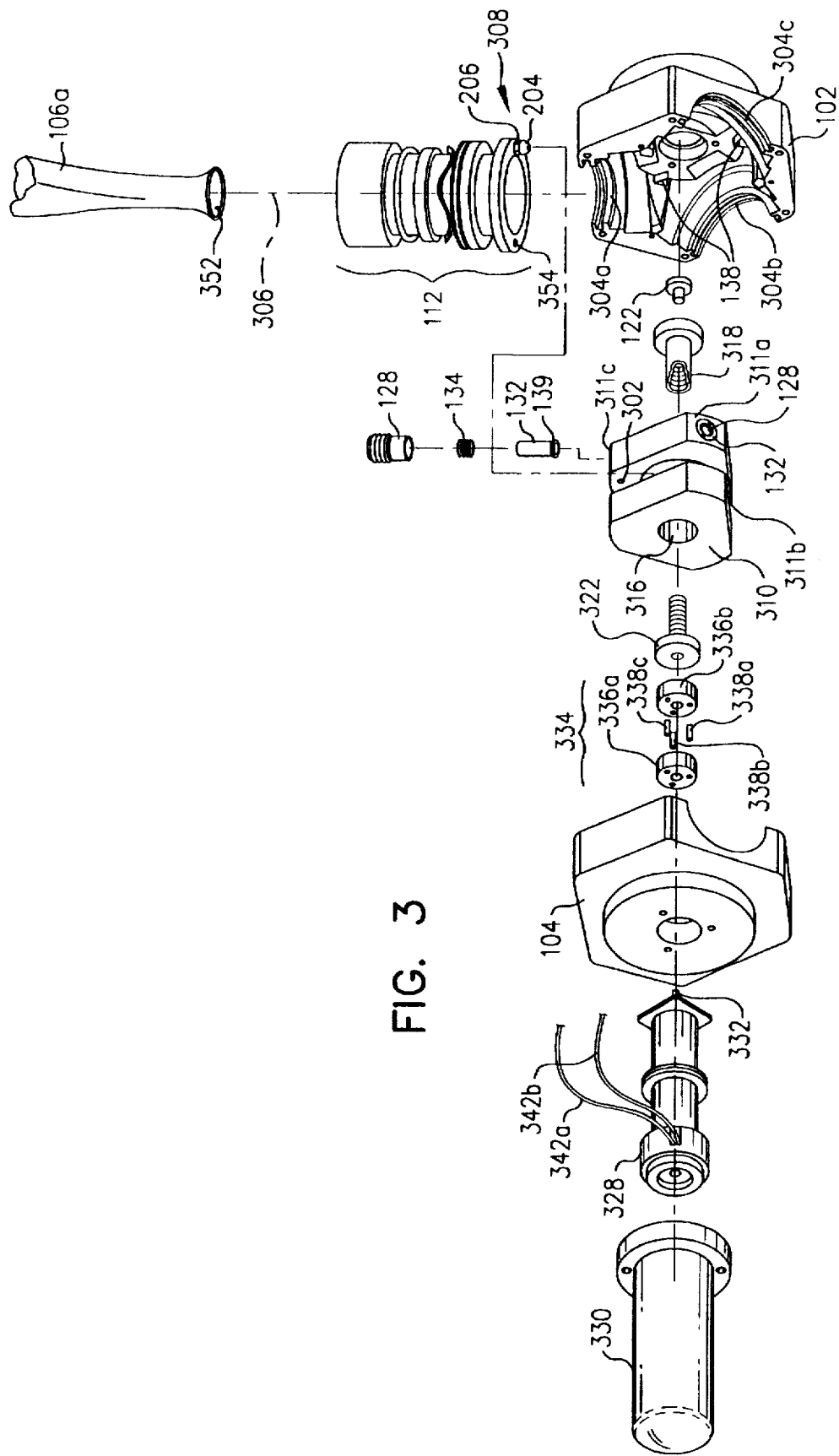
FIG. 3 is an exploded perspective view according to one embodiment of the present invention.
Figure 4:
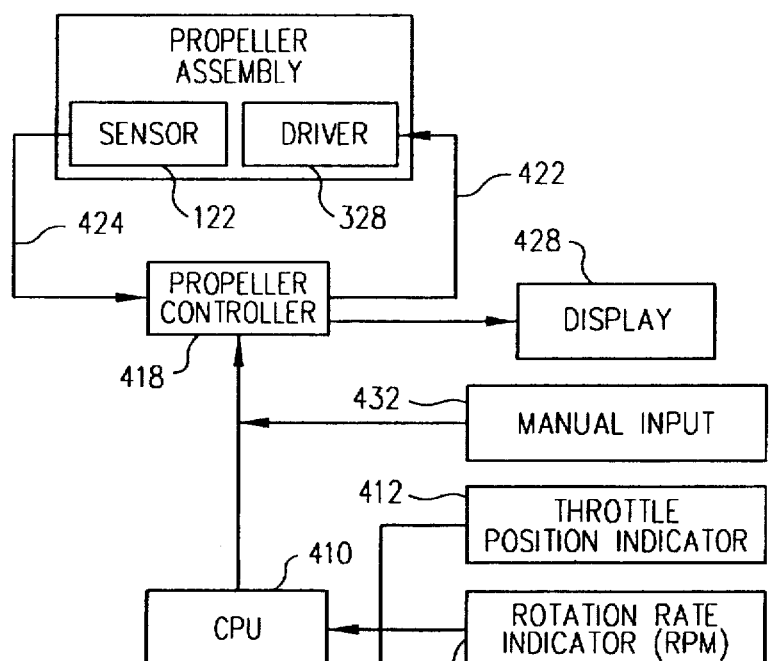
FIG. 4 is a block diagram of a pitch control system according to an embodiment of the present invention.
Figure 6:
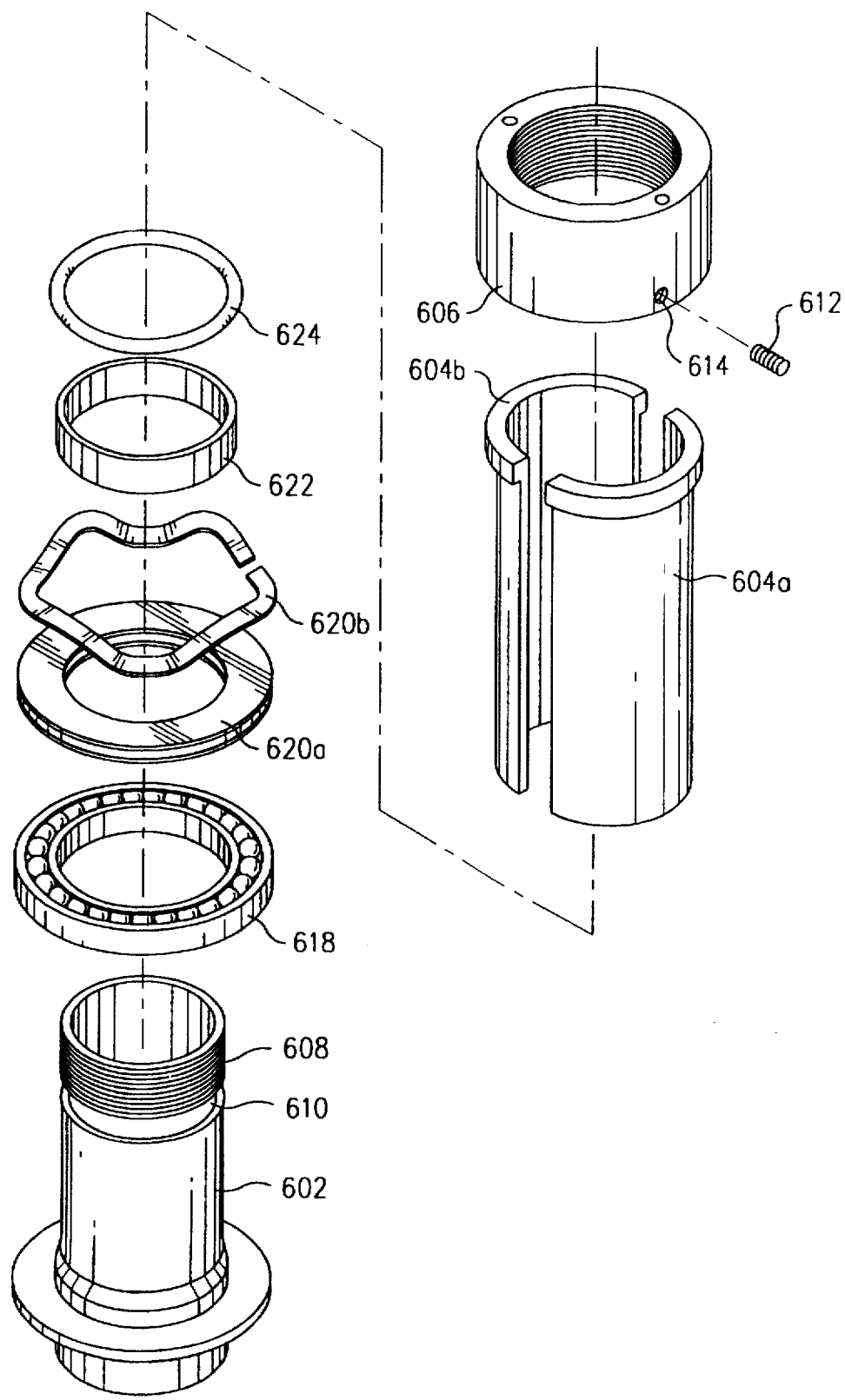
FIG. 6 is an exploded view of a blade socket assembly according to an embodiment of the present invention.

As depicted in FIG. 1A, in one embodiment of the invention a propeller hub made of a hub back half 102 and hub front half 104 hold a plurality of propeller blades 106a. The hub 104, 102 is coupled to a drive plate 108, e.g., by bolting, which is driven by a drive shaft (non shown) for rotation along a rotation axis 110. Each propeller blade 106a is held in the hub 102, 104 by a separate blade socket assembly 112. As seen in FIG. 6 the blade socket assembly includes a substantially cylindrical cuff 602 which receives a split collar 604a, 604b held in the cuff 602 by a blade retention nut 606 having interior threads to engage threads 608 on the cuff 602. An annular groove 610 formed in the cuff 602 receives a set screw 612 threaded through a hole 614 in the nut 606. The end of the set screw 612 resides in the annular groove 610 and bears against the edge of the groove 610 to resist both unscrewing and axial movement of the nut 606. The socket assembly also includes radial bearing 618, thrust bearing 620a, 620b, bushing 622 and 0-ring 624. The socket assembly 112 has a profile which is accommodated by grooves 202a, 202b, 202c, 202d formed in the mating halves of the hub 102, 104, as best seen in FIGS. 2 and 3. The lower surface of the cuff 602 has a shoulder bolt 204 (FIG. 2) extending downwardly therefrom rotatably supporting a flat-faceted washer 206. In one embodiment, the washer 206 has six facets and the perimeter defines, in cross section, a regular hexagon. Other shapes are possible although, preferably, a shape having two flat parallel sides is preferred in order to fit in the actuator groove 302 as described below. The socket assembly 112 fits in the groove hub openings 304a, 304b, 304c and is rotatable, therein about the blade longitudinal axis 306. Preferably the axis of longitudinal rotation of the blade lies substantially along the center of lift of the blade during normal blade operation. By providing pivoting along the center of lift, rotation of the blade along its longitudinal axis is easier since there is little off-axis torque or force. The blade 106a is non-rotatably coupled to the socket assembly 112 such that rotation of the socket assembly 112 about axis 306 causes rotation of the blade 106A about axis 306 thus resulting in a change of blade pitch.

Rotation of the socket assembly 112 is effected by creating a force, parallel to the rotation axis 110 on the socket pin assembly 308 which is made up of shoulder bolt 204 and washer 206. Socket pin 308 fits snugly within a groove 302 formed in actuator 310. Actuator 310 resides in a cavity 106 defined by mating hub sections 102, 104. Actuator 302 is axially movable within the cavity 106 along rotation axis 110 to move, e.g., from the aft-most position depicted in FIG. 1A to a more forward position depicted in FIG. 1B in a manner described more thoroughly below. As the actuator 310 moves along axis 110 the socket pin 308, being engaged in the actuator 302 is also moved in a path having an axial component parallel to axis 110 and, simultaneously, slides circumferentially within groove 302, causing socket assembly 112 to rotate about axis 306 and thus change the pitch of blade 106a. In the depicted embodiment, a socket assembly and blade combination are positioned in each of the hub openings 304a, 304b, 304c and include pins engaged in actuator groove 302 so that all blades will undergo simultaneous and equal changes in pitch in response to movement of the actuator 310.

In the depicted embodiment, the actuator 310 can be driven to various axial positions by a lead screw device driven by an electric motor. In the depicted embodiment, the actuator 310 has a central hole 316 for receiving a lead nut or drive nut 318. Drive nut 318 has internal threading engaging with external threads of drive screw or lead screw 322. Preferably the lead screw and lead nut are tight-fitting with very small tolerance such as a tolerance of about ±0.003 inches (about 0.7 mm). Providing such a tight tolerance helps to avoid departure or vibration of the blade from the desired pitch. It is believed less expensive to provide the actuator body 310 and lead nut 318 as coupled but non-integral (i.e., separately-formed) bodies. Further, it is preferred that at least one wall of the actuator groove 302 be formed of a material with a resiliency higher than that suitable for the lead nut, where high resiliency and/or inability to provide close tolerance with the lead screw can cause undesirable backlash. Drive assembly 310 is shaped to fit within a correspondingly-shaped cavity 106 and thus is constrained against rotation about rotation axis 110. Lead screw 322 is constrained, e.g., by bearings, against axial movement along axis 110. As a result, when lead screw 322 is driven to rotate around axis 110 as described below, lead nut 318 travels axially in response along axis 110 carrying with it actuator 310 to which it is coupled and ultimately resulting in a change in blade pitch as described above. The location of the pin assembly 308 along the circumference of the blade root, i.e. with respect to the blade air foil shape, will determine what pitches are available (forward pitch, reverse pitch) within the predefined range of pitches. In one embodiment the blade root is provided with a dimple 352 which can be aligned with a corresponding dimple or hole 354 to provide accurate orientation of the socket assembly 112 and thus of the pin 308 with respect to the airfoil shape of the blade 106a.

In the depicted embodiment, an electric motor 328, covered by motor cover 330 rotates a drive shaft 332. Rotation of the drive shaft 332 is transmitted to the lead screw 322 by a coupling 334 made up of a first coupling disk 336a rigidly coupled to drive shaft 332, a second coupling disk 336b rigidly coupled to lead screw 322 and coupling pins 338a, 338b, 338c extending therebetween and fitted in corresponding sockets on the coupling disks 336a, 336b. The pin coupling provides some isolation of the motor 328 from, e.g., vibration, contributes to ease of fabrication and forms a preferred failure point to prevent damage or failure of e.g., the lead screw.

In the depicted embodiment, the hub and all contained components rotate, as a unit, about longitudinal axis 110 in response to driving of the drive plate 108. Thus when it is stated, e.g., that the actuator 310 is constrained against rotation about axis 110 it is meant that the actuator 310 is constrained against rotation with respect to the housing 102, 104.

Preferably there is a relatively large amount of force required to move the actuator 310. In particular, the mechanical advantage involved in transmitting rotational force from the blade 106a to the actuator 310 should be sufficiently small that aerodynamic or other forces on the blade 106 tending to make the blade rotate around axis 306 are unable to effect movement of the actuator 310. In this way, if there is a mechanical failure such that the actuator 310 is no longer held in its axial position by, e.g., the coupled lead screw 322, the actuator 310 will nevertheless remain substantially in place, axially, because of the insufficiency of mechanical advantage for moving the actuator 310.

Preferably the motor 328 is controllable, e.g. to permit automatic and/or manual changes in blade pitch. In order to provide control signals or other communication to components within the rotating hub, one or more commutator or slip rings 122a, 122b, 112c are provided on the drive plate 108 for communication via, e.g., brushes (not shown) to a controller, computer or other electrical or electronic device. Communication between the commutator rings 122 and electrical components such as the motor 328 are provided over wires 342a, 342b accommodated in wire channels (not shown) in the hub 102, 104. Information about the current location of the actuator 310 and thus the current blade pitch can be provided from a position encoder 122 via the commutator rings 122a, 122b, 122c. In one embodiment the sensor 122 is a ten turn potentiometer while the lead screw and lead nut provide, e.g. and eight turn range. The potentiometer thus can provide a variable resistor for providing an indication of a position of the actuator 310 and thus the pitch of the blade 106 over line 424.

If desired, the hub 102, 104 can be driven by providing an adapter disk or plate 109 with appropriate wiring holes 111 between the drive plate 108 and the hub back half 102 for the purpose, e.g., of accommodating different bolt patterns 105a, 105b, 107a, 107b for various types of drive plates 108.

In one embodiment, the hub halves 102, 104, lead screw 322, lead nut 318, couplings 336, cover 330 and portions of the socket 112 other than the 0-ring 624 and bearings 622, 620 are formed of metal such as steel, preferably stainless steel, or a light weight metal such as an aluminum and/or titanium alloy. In one embodiment the actuator 310 is non-metallic. In this embodiment it is preferred to make the actuator 310 from a non-metallic material because it is important to fit the flat faces of the nut 206 firmly and securely against the edges of the groove 302 (e.g., to avoid backlash or other undesirable effects). However, the machining tolerances required to achieve such a tight fit in a metal actuator are believed to be currently very expensive. Accordingly it is preferred to make actuator 310 out of a substantially resilient material so that the groove 302 can be made with a relatively low tolerance, preferably with the groove 302 equal to or even slightly smaller than the distance between opposed faces of the nut 206. Because the actuator 310 is made of a resilient material, however, the washer 206 can be fit snugly into the groove 302 such as by a press fit, relying on the resiliency of the material of actuator 310 for holding the washer 206 securely in the groove 302 without undesirable backlash. In one embodiment, actuator 310 (or at least the portions defmiing the groove 302) are formed of a resin material such as an acetal resin, e.g. that available from E.I. DuPont de Nemours and Company of Wilmington, Del. under the trademark Defrin®.

Figure 1B:
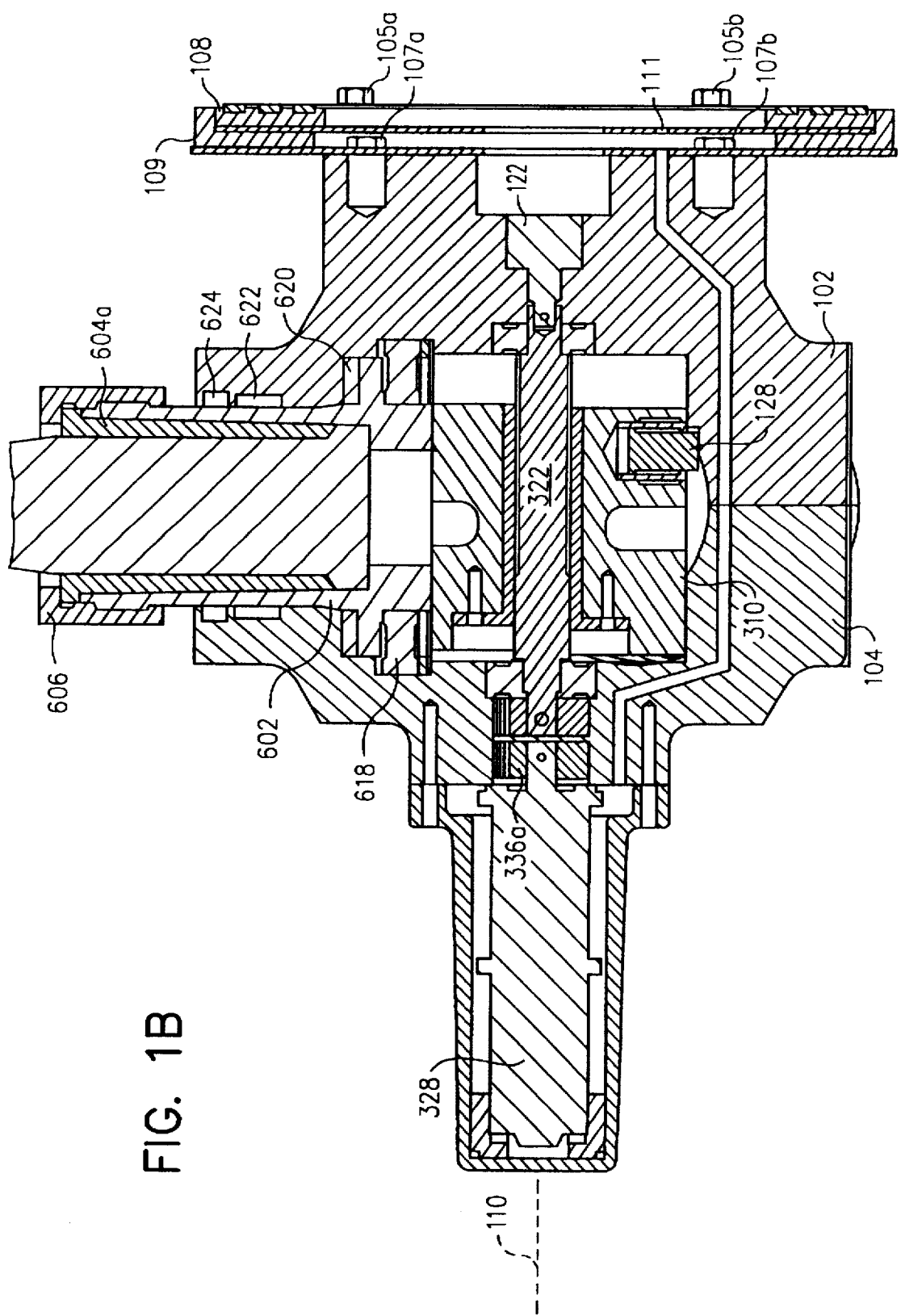
FIG. 1B is a cross sectional view similar to that of FIG. 1A but showing the actuator in a displaced position.

In the depicted embodiment, the actuator 310 includes a plurality of radial wells 126 for receiving a lockout housing 128 holding a lockout pin 132. A spring 134 is captured between a lockout pin rim 138 and a housing lip 142 urging the pin 132 to a position substantially interior of the lockout housing 128 as depicted in FIG. IA. When the lockout pin is in the retracted (unextended) configuration depicted in FIG. 1A, the blade pitch can be changed within a first, full range of pitch, such as a range of about 45°. When the actuator 310 is moved to a forward position as depicted in FIG. 1B the lockout pin 132 will continue to be retained in housing 128 unless the hub and propellers are rotating about rotation axis 110 at a sufficiently high rate of rotation. At a sufficiently high rotation rate, centrifugal force will cause the lockout pin 128 to move radially outward against the urging of spring 134, e.g. to the position depicted in FIG. 1B. In one embodiment, three lockout pins are provided, one in each lobe 311a, 311b, 311c of the actuator 310. Axially aligned with each lockout pin 132 is a shoulder 138 formed in the rear housing half 102. When the lockout pin 128 is in the centrifugally extended position depicted in FIG. I B, as the actuator 310 is driven aft, the edge of the lockout pin 128 will contact the shoulder or ledge 138 preventing further axial movement of the actuator 310 (and thus further pitch changes resulting from such further aft axial movement) at least until the propeller rotation rate drops to a rate at which the force of spring 134 exceeds centrifugal force on the pin 128. The effect, thus, is to limit the range of available propeller blade pitch changes while the propeller is moving faster than a predetermined rpm (revolutions per minute). This feature can be used to prevent the propeller blades from being moved to a undesirably small and/or negative pitch during flight, (i.e. when the propeller is rotating at a relatively high rotation rate). However, driving the propeller blades to a small or negative pitch is still permitted when propeller rotation rate is relatively small as will typically be the case when the aircraft is on the ground. By providing three lockout pins, a triply redundant safety system is provided.

In one embodiment the blade pitch is controlled automatically. In this embodiment a computer having a central processing unit (CPU) 410 receives information from which optimal blade pitch can be calculated. In the present context, preference to an "optimal" pitch is not necessarily limited to a single, mathematically precise optimal value. Those in the art recognize that there may be a certain amount of indeterminacy or imprecision regarding desirable propeller pitch and in this context propeller pitch is optimized if the pitch is better than at least some other possible propeller pitch for a given set of conditions. In one embodiment, the information received by the CPU includes throttle position provided by throttle position indicator 412, crankshaft rpm provided by a rotation rate indicator 414 such as a Hall effect sensor, and manifold pressure provided by manifold pressure indicator 416. The blade pitch which is optimal for given throttle rpm and manifold pressure will depend on the flight characteristics of the aircraft concerned. In one embodiment the computer executes a program which calculates a optimal pitch based on a formula developed specifically for the flight characteristics of the aircraft. In another embodiment, a table containing optimal pitch for various throttle rpm and manifold pressure conditions for the aircraft is stored in memory and, in a manner well known to those skilled in the art, the optimum propeller pitch is obtained by looking up a pitch from an optimum propeller pitch table. In one embodiment the computer then outputs an analog signal such as a voltage between zero and five volts corresponding to the desired or optimal propeller pitch.

The analog signal is then received by a propeller controller 418. The controller receives information from the sensor 122 related to the current pitch position and provides commands to the driver, e.g. motor 328 for making any pitch adjustments that may be necessary. The propeller controller 418 performs signal conditioning, effectively translating between the analog signal output by the CPU indicating the desired pitch and the signals 422, 424 (preferably conveyed over commutator rings 122) which may have a different signal format such as different ranges of voltages, or which may be digital rather than analog signals. In one embodiment the driver device 328 is a DC motor and signal 422 consists of power applied to the motor 328 for a predetermined period of time with polarity determining direction (clockwise or counterclockwise) of rotation. In other embodiments, the driver 328 may be stepper motor, or other electric motor or maybe a non-electric driver system such as spring driven, a pneumatic or hydraulic system, or the like.

Figure 5:
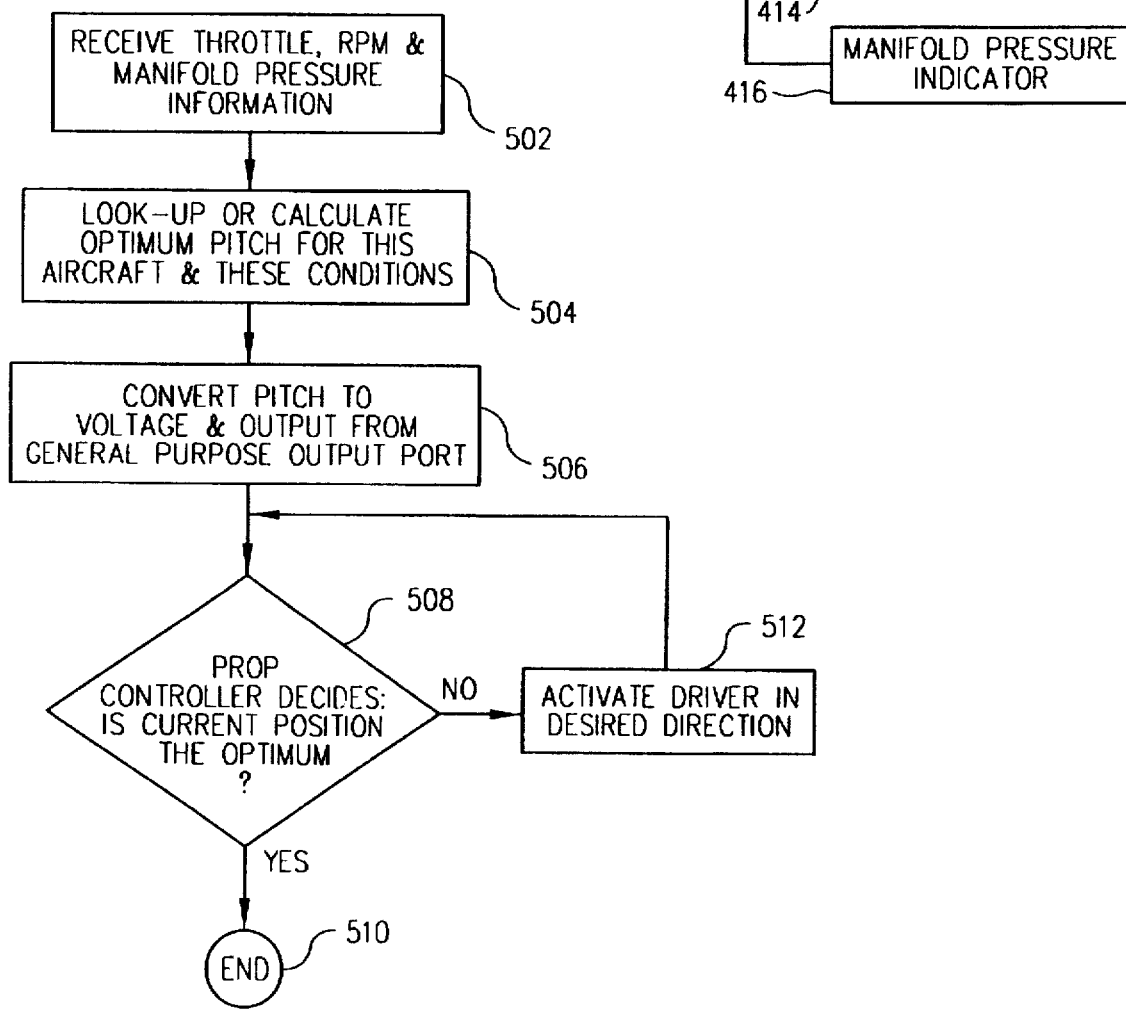
FIG. 5 is a flow diagram of a process for pitch control according to an embodiment of the present invention.

As depicted in FIG. 5, in one embodiment the CPU 410 will receive the throttle rpm and manifold pressure information 502. The CPU 410 then calculates or looks up the optimum pitch for this particular aircraft and these conditions 504. This information is converted into a voltage and is output, e.g. from a general purpose output port 506. The propeller controller 418 then determines, e.g., based on the value of variable resistor 122, obtained on line 424, whether the current pitch is already equal to or sufficiently close to an optimum pitch 508. If so, the procedure ends 510 and another iteration of control can commence. If the pitch is not currently optimum, the propeller controller 418 outputs a signal over line 422 to actuate the driver 328 in the desired direction (clockwise or counterclockwise in order to drive the actuator 318 fore or aft 512). The controller 418 then determines, e.g., via a signal on line 424, if the pitch is now optimum and the process repeats until an optimum position is achieved 510.

Preferably the propeller controller 418 also outputs a display 428 of the current propeller pitch which can be read by the pilot. In one embodiment, the pitch is displayed to a precision of about 0.1°. Preferably the display 428 is provided regardless of whether the pitch is being controlled automatically, e.g. by a computer 410. In one embodiment, the propeller blades are driven to a known pitch (e.g. an extreme pitch) and the display 428 is calibrated to correctly display the known pitch.

In one embodiment, the pilot is permitted to manually adjust pitch by providing a manual input 432 to the propeller controller which will preferably override any commands issued by the CPU 410. In one embodiment, the pilot can disable automatic pitch control. When automatic pitch control is in effect, the pilot will typically control only the throttle.

In one embodiment the propeller controller 418 outputs a warning if the propeller blade pitch becomes negative. In one embodiment the indicator provided is a flashing decimal point in the pitch angle indicator display 428. In one embodiment the propeller controller 418 outputs an indication of an overload condition in the motor 328. This can be achieved by monitoring the amount of current being drawn by the motor 328. An overload condition can be sensed as a current draw greater than a predetermined threshold, e.g. 1½ amps. An overload condition may indicate that the lockout pin 128 has contacted the stop position 138. However, an overload condition can also mean that the system is binding in some fashion and thus may provide a useful indication of a need for maintenance.

In light of the above description a number of advantages of the present invention can be seen. The present invention provides a variable pitch mechanism for a propeller blade which is relatively low cost, easy to maintain construct and design. The present invention provides a preferably redundant lockout mechanism to limit the range of blade pitch while the propeller is at a relatively high rotation rate. The present invention provides the capability for automatic pitch control and/or manual pitch control, preferably with indications of amount of pitch, warnings of negative pitch and/or engine overload.

A number of variations and modifications of the invention can be used. Some aspects of the invention can be used without using other aspects. For example, it is possible to provided a variable pitch mechanism which rotates as a unit without providing a lockout mechanism or vice versa. It is possible to provide automatic control pitch without providing display of pitch. Although the illustrated embodiment provides for a three blade propeller, other numbers of blades can be used. Although a lead screw mechanism for moving an actuator is provided, other ways of moving the pin 308 can be used including linear motors, rack and pinion systems and the like.

Although the invention has been described by way of a preferred embodiment in certain variations and modifications other variations and modifications can also be used, the invention being defined by the following claims.

What is claimed is:

1. A propeller assembly comprising
    a plurality of blades rotatable about a rotation axis, each blade also rotatable about a longitudinal axis and having a pin parallel to and spaced from said longitudinal axis;
    an actuator movable along a first path and having at least one region for receiving said pin wherein movement of said actuator along said first path results in rotation of said blade about said longitudinal axis; and
    a controllable driver, capable of being in an active state or an inactive state, said controllable driver, when in said active state, being coupled to said actuator by a connector which is non-integral with said actuator to move said actuator along said rotation axis, said driver when in said inactive state rotating about said rotation axis.

2. A propeller assembly as claimed in claim 1 wherein said blade, actuator and driver rotate substantially as a unit about said rotation axis.

3. A propeller assembly as claimed in claim 1 wherein said one region for receiving said pin comprises at least a first groove formed in a surface of said actuator and wherein at least one wall of said groove comprises a substantially resilient material.

4. A propeller assembly as claimed in claim 3 wherein said resilient material comprises an acetal resin.

5. A propeller assembly comprising:
    a plurality of blades rotatable about a rotation axis, each blade also rotatable about a longitudinal axis and having a pin parallel to and spaced from said longitudinal axis;
    actuator means for receiving said pin and rotating said blade along said longitudinal axis in response to movement of said actuator along said rotation axis; and
    means for driving said actuator along said rotation axis, wherein said means for driving rotates substantially along with said plurality of blades, about said rotation axis.

6. In a propeller assembly having a plurality of blades rotatable about a rotation axis, each blade also rotatable about a blade longitudinal axis, a method for changing pitch comprising:
    providing a pin parallel to and spaced from said blade longitudinal axis, coupled to said blade, said pin rotatably supporting a washer;
    receiving said washer in an actuator;
    moving said actuator along said rotation axis using an electric motor; and
    rotating said plurality of blades, said actuator and said electric motor substantially as a unit about said rotation axis.

* * * * *